US011945677B2

(12) United States Patent
Masunaga

(10) Patent No.: US 11,945,677 B2
(45) Date of Patent: Apr. 2, 2024

(54) IMAGE FORMING APPARATUS AND IMAGE FORMING METHOD

(71) Applicant: Suguru Masunaga, Kanagawa (JP)

(72) Inventor: Suguru Masunaga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 337 days.

(21) Appl. No.: 17/528,195

(22) Filed: Nov. 17, 2021

(65) Prior Publication Data

US 2022/0169476 A1 Jun. 2, 2022

(30) Foreign Application Priority Data

Nov. 27, 2020 (JP) ................................ 2020-197167

(51) Int. Cl.
*B65H 43/04* (2006.01)
*B41J 11/42* (2006.01)
(Continued)

(52) U.S. Cl.
CPC .............. *B65H 43/04* (2013.01); *B41J 11/42* (2013.01); *B41J 29/38* (2013.01); *B65H 20/02* (2013.01);
(Continued)

(58) Field of Classification Search
CPC .... B65H 43/04; B65H 20/02; B65H 2513/40; B65H 2801/21; B65H 2301/4493; B65H 2511/12; B65H 2557/24; B65H 2801/36; B65H 23/1882; B41J 11/42; B41J 29/38; B41J 15/04; B41J 29/02; B41J 2/17509
See application file for complete search history.

(56) References Cited

U.S. PATENT DOCUMENTS

2010/0231632 A1 9/2010 Kobayashi et al.
2011/0164077 A1 7/2011 Masunaga
(Continued)

FOREIGN PATENT DOCUMENTS

JP 2006-346938 12/2006
JP 2007-197186 8/2007
(Continued)

OTHER PUBLICATIONS

Terada Kohei, Mage Recording Apparatus, Mar. 17, 2011, Japan, All Pages (Year: 2011).*
(Continued)

*Primary Examiner* — Justin Seo
*Assistant Examiner* — Tracey M McMillion
(74) *Attorney, Agent, or Firm* — XSENSUS LLP

(57) ABSTRACT

An image forming apparatus includes a sheet conveyance device; an image forming device including a sheet conveyance roller and a pressure roller; a memory; and a controller. The memory stores profile data indicating variation in conveyance amount in a circumferential direction due to eccentricity of the conveyance roller. The controller calculates, in intermittent conveyance processing, a correction value based on corresponding profile data for each of positions included in a width of an image to be formed in next image forming processing, the correction value being a difference between a predetermined conveyance amount and an actual conveyance amount; corrects a reference amount of rotation by a representative value of calculated correction values to calculate a corrected amount of rotation, the reference amount being an ideal amount of rotation of the conveyance roller that conveys a sheet by the predetermined conveyance amount; and rotates the conveyance roller by the corrected amount.

6 Claims, 10 Drawing Sheets

(51) Int. Cl.
*B41J 29/38* (2006.01)
*B65H 20/02* (2006.01)

(52) U.S. Cl.
CPC ...... *B65H 2513/40* (2013.01); *B65H 2801/21* (2013.01)

(56) References Cited

U.S. PATENT DOCUMENTS

| | | | |
|---|---|---|---|
| 2012/0306950 | A1 | 12/2012 | Kobayashi et al. |
| 2013/0002743 | A1 | 1/2013 | Masunaga |
| 2013/0057604 | A1 | 3/2013 | Masunaga et al. |
| 2013/0127937 | A1 | 5/2013 | Masunaga et al. |
| 2013/0135368 | A1 | 5/2013 | Kobayashi et al. |
| 2013/0135401 | A1 | 5/2013 | Kobayashi et al. |
| 2013/0147867 | A1 | 6/2013 | Kobayashi et al. |
| 2013/0235129 | A1 | 9/2013 | Masunaga |
| 2014/0132671 | A1 | 5/2014 | Masunaga |
| 2015/0054898 | A1 | 2/2015 | Kondo et al. |
| 2015/0258822 | A1 | 9/2015 | Masunaga |
| 2016/0121626 | A1 | 5/2016 | Masunaga et al. |
| 2017/0151815 | A1 | 6/2017 | Masunaga |
| 2017/0368849 | A1 | 12/2017 | Masunaga |
| 2019/0283469 | A1 | 9/2019 | Fujii et al. |
| 2020/0039250 | A1 | 2/2020 | Kizaki et al. |
| 2020/0262221 | A1 | 8/2020 | Yokozawa et al. |
| 2021/0155435 | A1 | 5/2021 | Masunaga |

FOREIGN PATENT DOCUMENTS

| | | |
|---|---|---|
| JP | 2008-260169 | 10/2008 |
| JP | 2010-214662 | 9/2010 |
| JP | 2015-090475 | 5/2015 |

OTHER PUBLICATIONS

Kosaka Kei, Inkjet Recording Apparatus and Control Method Therefor, Mar. 17, 2019, Japan, All Pages (Year: 2019).*

* cited by examiner

IMAGE FORMING APPARATUS AND IMAGE FORMING METHOD

CROSS-REFERENCE TO RELATED APPLICATION

This patent application is based on and claims priority pursuant to 35 U.S.C. § 119(a) to Japanese Patent Application No. 2020-197167, filed on Nov. 27, 2020, in the Japan Patent Office, the entire disclosure of which is hereby incorporated by reference herein.

BACKGROUND

Technical Field

Embodiments of the present disclosure relate to an image forming apparatus and an image forming method.

Discussion of the Background Art

An image forming apparatus that repeats intermittent conveyance processing of conveying a sheet by a predetermined conveyance amount and image forming processing of forming an image on an area of the sheet facing a recording head by the intermittent conveyance processing to form an image on the sheet is conventionally known. In such image forming apparatus, the conveyance amount in the intermittent conveyance processing might fluctuate due to eccentricity of a sheet conveyance roller that conveys the sheet, and density unevenness of an image on the sheet might occur.

Here, an eccentricity amount of the sheet conveyance roller is not uniform in an axial direction. Therefore, a technology of correcting the conveyance amount in the intermittent conveyance processing using a correction value corresponding to a width of the sheet among correction values stored in advance in a memory is known.

SUMMARY

In an embodiment of the present disclosure, there is provided an image forming apparatus that includes a sheet conveyance device, an image forming device, a memory, and a controller. The sheet conveyance device includes a sheet conveyance roller and a pressure roller to hold and convey a sheet between the sheet conveyance roller and the pressure roller. The image forming device forms an image on the sheet conveyed by the sheet conveyance device. The memory stores profile data for each of a plurality of positions in an axial direction of the sheet conveyance roller. The profile data indicates a variation in conveyance amount in a circumferential direction due to eccentricity of the sheet conveyance roller. The controller controls the sheet conveyance device and the image forming device. The controller repeatedly executes intermittent conveyance processing and image forming processing. The intermittent conveyance processing includes rotating the sheet conveyance roller to cause the sheet conveyance device to convey the sheet by a predetermined conveyance amount. The image forming processing includes causing the image forming device to form an image on an area of the sheet having been conveyed to a position facing the image forming device by the intermittent conveyance processing. The controller calculates, in the intermittent conveyance processing, a correction value based on corresponding profile data for each of a plurality of positions included in a width of an image to be formed on the sheet in next image forming processing, the correction value being a difference between the predetermined conveyance amount and an actual conveyance amount; corrects a reference amount of rotation by a representative value of a plurality of calculated correction values to calculate a corrected amount of rotation, the reference amount of rotation being an ideal amount of rotation of the sheet conveyance roller that conveys the sheet by the predetermined conveyance amount; and rotates the sheet conveyance roller by the corrected amount of rotation calculated.

In another embodiment of the present disclosure, there is provided an image forming method to be executed by an image forming apparatus that includes an image forming device and a sheet conveyance device. The sheet conveyance device includes a sheet conveyance roller and a pressure roller to hold and convey a sheet between the sheet conveyance roller and the pressure roller. The image forming method includes executing, calculating, correcting, and rotating. The executing repeatedly executes intermittent conveyance processing and image forming processing. The intermittent conveyance processing including rotating the sheet conveyance roller to convey the sheet by a predetermined conveyance amount. The image forming processing includes causing the image forming device to form an image on an area of the sheet having been conveyed to a position facing the image forming device by the intermittent conveyance processing. The calculating calculates, in the intermittent conveyance processing, a correction value based on corresponding profile data for each of a plurality of positions included in a width of an image to be formed on the sheet in next image forming processing. The correction value is a difference between the predetermined conveyance amount and an actual conveyance amount. The corresponding profile data indicates a variation in conveyance amount in a circumferential direction due to eccentricity of the sheet conveyance roller. The correcting corrects a reference amount of rotation by a representative value of a plurality of calculated correction values to calculate a corrected amount of rotation. The reference amount of rotation is an ideal amount of rotation of the sheet conveyance roller that conveys the sheet by the predetermined conveyance amount. The rotating rotates the sheet conveyance roller by the corrected amount of rotation calculated.

BRIEF DESCRIPTIONS OF THE DRAWINGS

A more complete appreciation of the disclosure and many of the attendant advantages and features thereof can be readily obtained and understood from the following detailed description with reference to the accompanying drawings, wherein.

Figure 1:
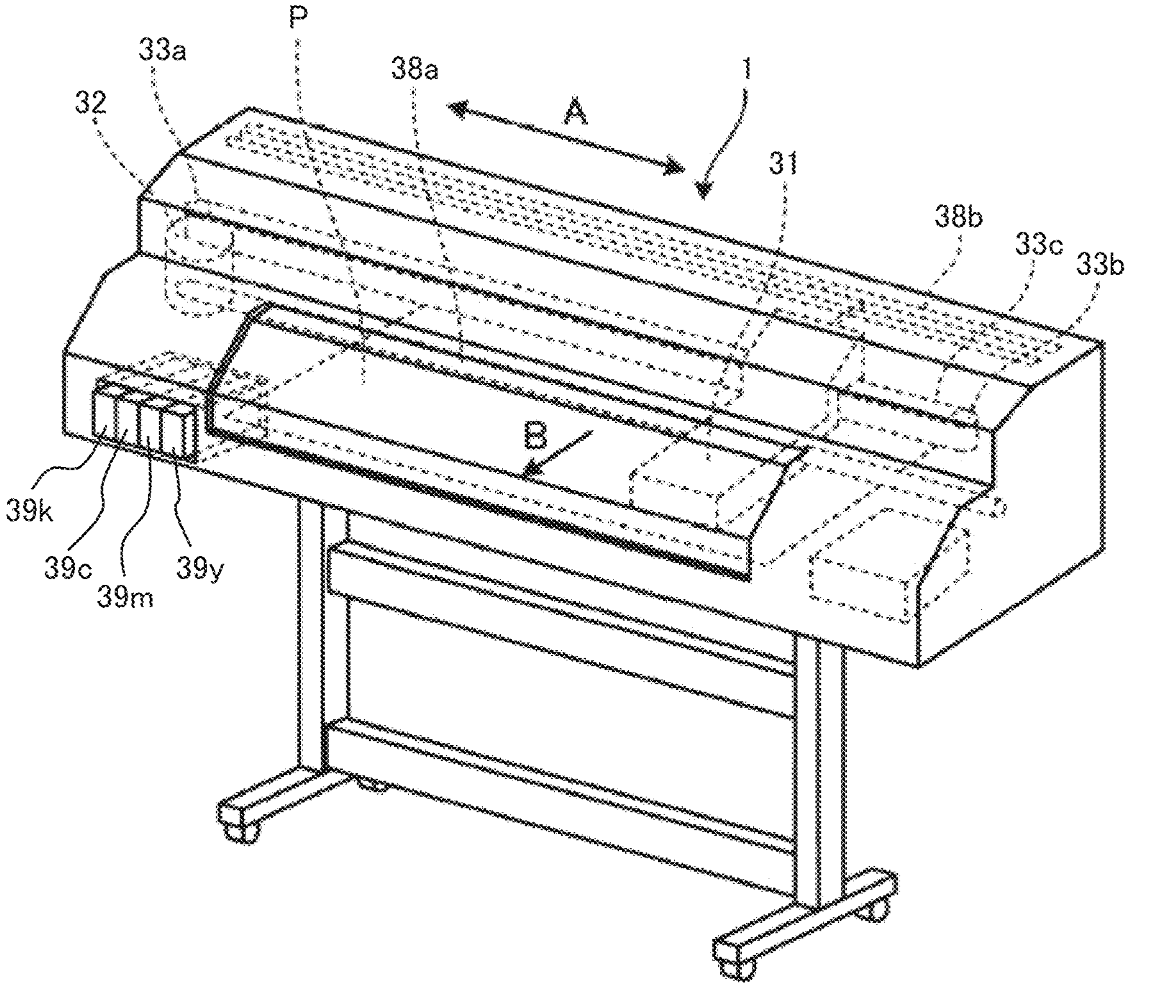
FIG. 1 is a perspective view illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below.

Figure 2:
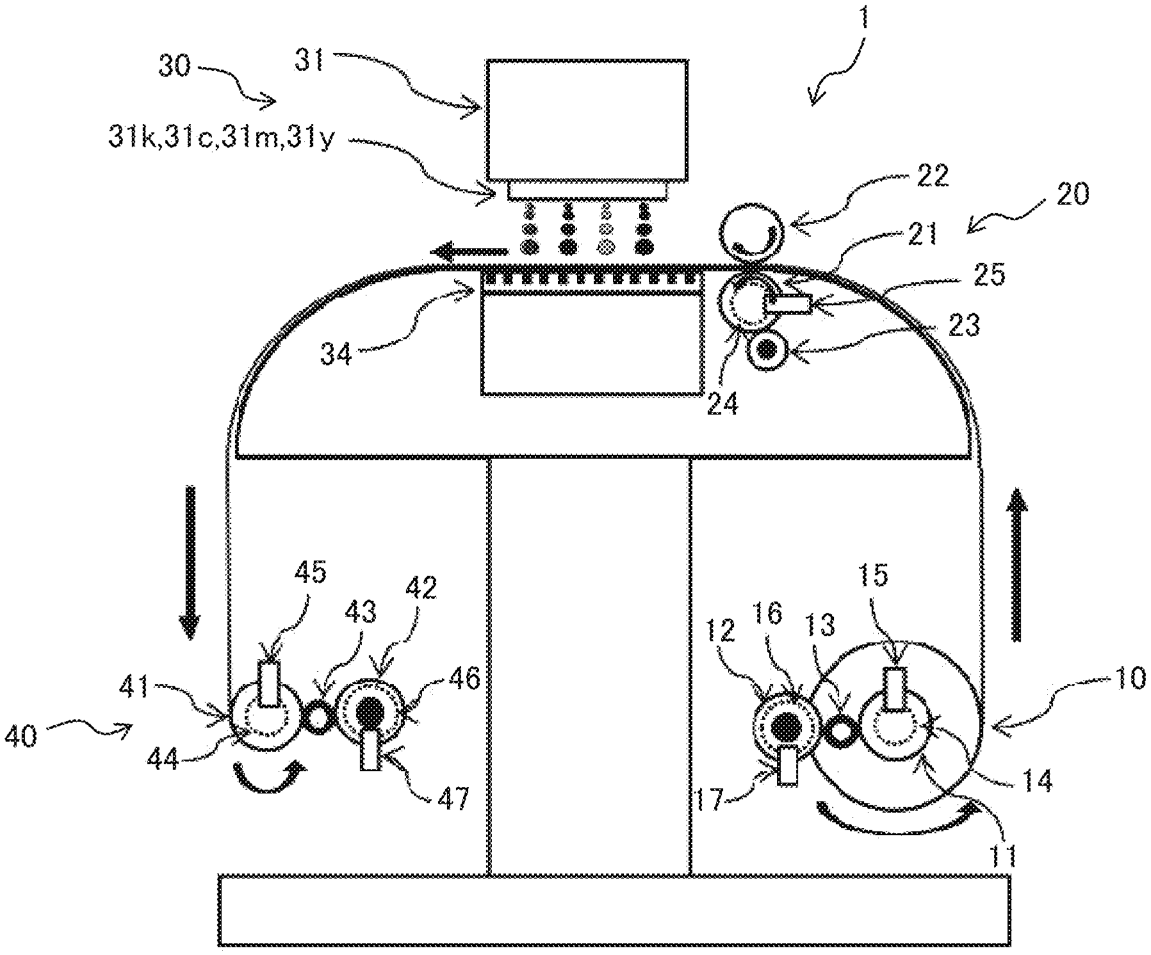
FIG. 2 is a cross-sectional view illustrating the internal configuration of the image forming apparatus of FIG. 1.
Figure 3:
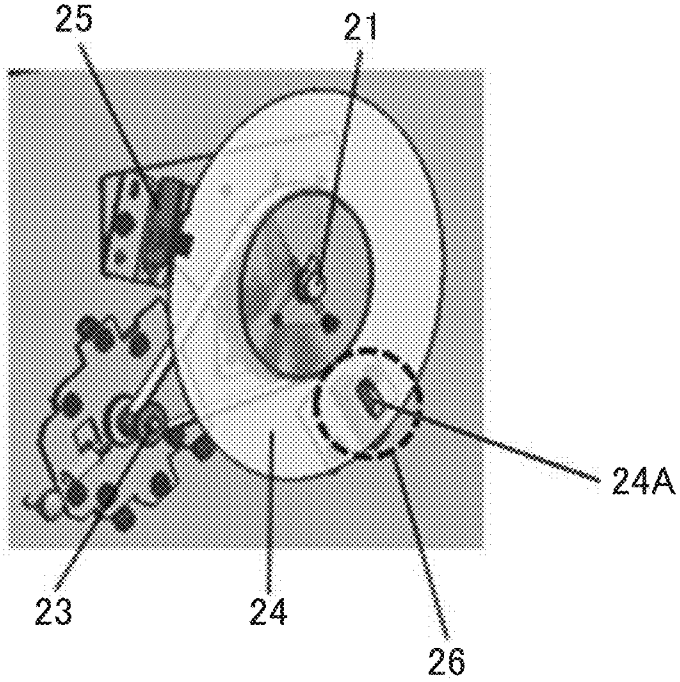
FIG. 3 is a diagram illustrating a detailed configuration of a sheet conveying device provided to the image forming apparatus of FIG. 1.
Figure 4:
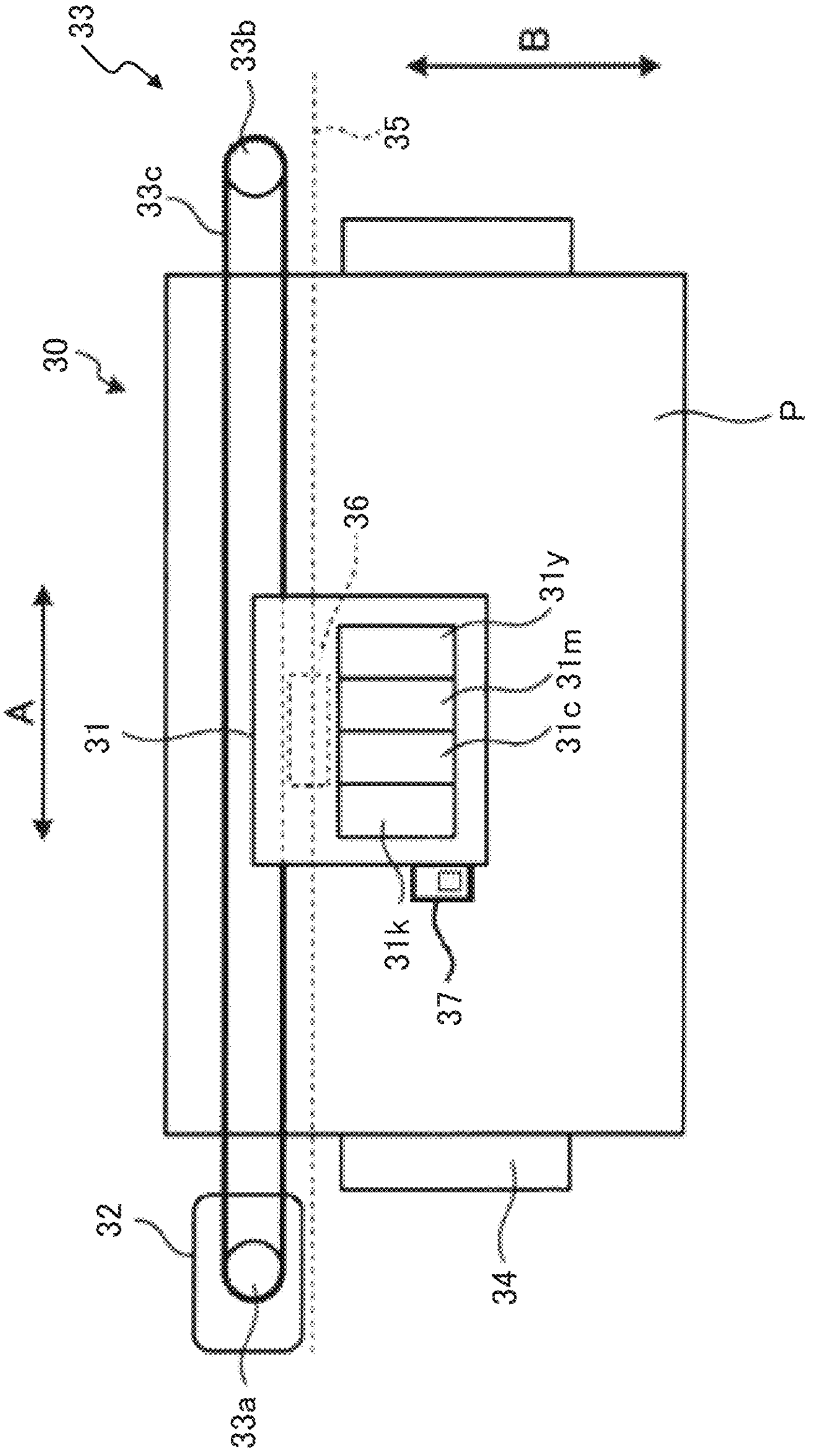
FIG. 4 is a plan view illustrating a detailed configuration of an image forming device provided in the image forming apparatus of FIG. 1.
Figure 5:
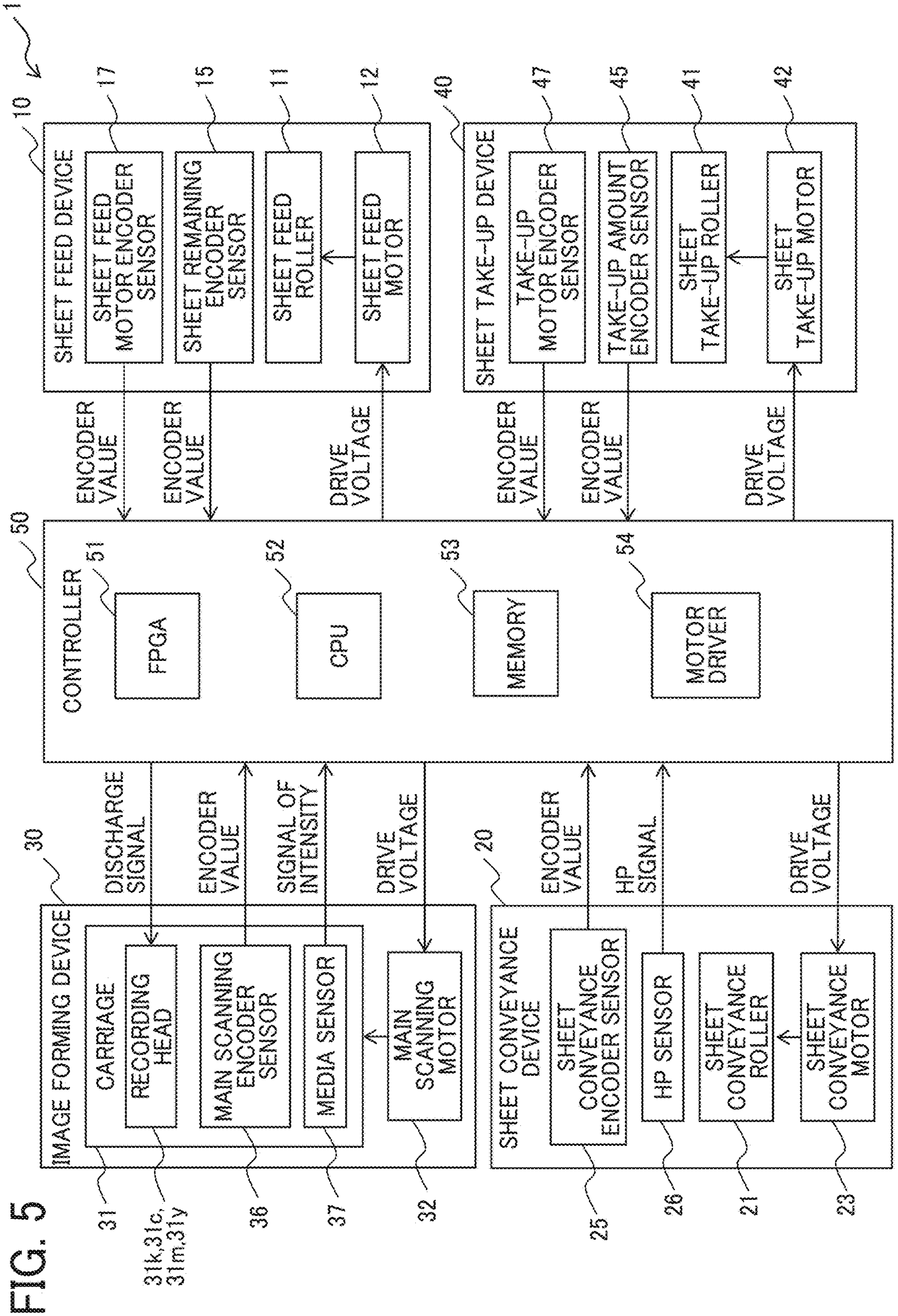
FIG. 5 is a block diagram illustrating the image forming apparatus of FIG. 1.

Hereinafter, an image forming apparatus 1 according to an embodiment of the present disclosure will be described with reference to FIGS. 1 to 5. FIG. 1 is a perspective view illustrating a configuration of an image forming apparatus 1 according to the present embodiment of the present disclosure. FIG. 2 is a cross-sectional view illustrating the internal configuration of the image forming apparatus 1 of FIG. 1. FIG. 3 is a diagram illustrating a detailed configuration of a sheet conveyance device 20 provided to the image forming apparatus 1 of FIG. 1. FIG. 4 is a plan view illustrating a detailed configuration of an image forming device 30 provided in the image forming apparatus 1 of FIG. 1. FIG. 5 is a block diagram of the image forming apparatus 1 of FIG. 1.

The image forming apparatus 1 according to this embodiment is an inkjet type image forming apparatus that discharges ink to a continuous sheet P (band-shaped medium) as an example of a sheet to form an image on the continuous sheet P. However, the image forming method performed in the image forming apparatus 1 is not limited to the inkjet method and may be an electrophotographic method. The image forming apparatus 1 mainly includes a sheet feed device 10, a sheet conveyance device 20, an image forming device 30, a sheet take-up device 40, and a controller 50 that functions as circuitry.

The sheet feed device 10 applies a predetermined tension force to the continuous sheet P between the sheet feed device 10 and the sheet conveyance device 20. The sheet feed device 10 mainly includes a sheet feed roller 11, a sheet feed motor 12, a torque limiter 13, a sheet remaining encoder sheet 14, a sheet remaining encoder sensor 15, a sheet motor encoder sheet 16, and a sheet feed motor encoder sensor 17.

The continuous sheet P before bearing an image is wound around the sheet feed roller 11. The sheet feed motor 12 rotates the sheet feed roller 11 by application of drive voltage caused by the controller 50. The torque limiter 13 manages the upper limit of the torque to be transmitted from the sheet feed motor 12 to the sheet feed roller 11.

The sheet remaining encoder sheet 14 rotates together with the sheet feed roller 11 as a single unit. The sheet remaining encoder sensor 15 reads the amount of rotation of the sheet remaining encoder sheet 14 and outputs the pulse signal indicating the read amount of rotation of the sheet remaining encoder sheet 14, to the controller 50. The sheet motor encoder sheet 16 rotates together with the output shaft of the sheet feed motor 12 as a single unit. The sheet feed motor encoder sensor 17 reads the amount of rotation of the sheet motor encoder sheet 16 and outputs the pulse signal indicating the read amount of rotation of the sheet motor encoder sheet 16, to the controller 50.

The sheet feed device 10 rotates the sheet feed roller 11 in a sheet take-up direction in which the continuous sheet P held between a sheet conveyance roller 21 and a pressure roller 22 is taken up. As a result, the image forming apparatus 1 applies a predetermined tension force that corresponds to the upper limit value of the torque set in the torque limiter 13, to the continuous sheet P between the sheet feed device 10 and the sheet conveyance device 20.

The sheet conveyance device 20 conveys the continuous sheet P fed from the sheet feed device 10 to the sheet take-up device 40 via a position facing the image forming device 30. The sheet conveyance device 20 mainly includes the sheet conveyance roller 21, the pressure roller 22, a sheet conveyance motor 23, a sheet conveyance encoder sheet 24, a sheet conveyance encoder sensor 25, which is an example of a rotation amount sensor, and an HP sensor 26, which is an example of a reference point sensor.

The sheet conveyance roller 21 and the pressure roller 22 rotate while holding the continuous sheet P from both sides in a thickness direction of the continuous sheet P. The sheet conveyance roller 21 has a cylindrical outer shape. A length in an axial direction of the sheet conveyance roller 21 is set to be longer than a maximum width of the continuous sheet P that may be conveyed by the sheet conveyance device 20. When a driving force of the sheet conveyance motor 23 is transmitted to the sheet conveyance roller 21 through a torque limiter, the sheet conveyance roller 21 rotates. The pressure roller 22 is pressed against the sheet conveyance roller 21 by application of a predetermined pressure and is rotated with rotation of the sheet conveyance roller 21.

The sheet conveyance encoder sheet 24 rotates together with the sheet conveyance roller 21 as a single unit. The sheet conveyance encoder sensor 25 reads the amount of rotation of the sheet conveyance encoder sheet 24 and outputs the pulse signal indicating the read amount of rotation of the sheet conveyance encoder sheet 24, to the controller 50.

The HP sensor 26 is provided so as to face the sheet conveyance encoder sheet 24. The HP sensor 26 is an optical sensor that outputs an HP signal to the controller 50 at a timing when this faces a through hole (reference point) 24A provided at one position in a circumferential direction of the sheet conveyance encoder sheet 24. That is, the HP sensor 26 outputs the HP signal once each time the sheet conveyance encoder sheet 24 (in other words, the sheet conveyance roller 21) rotates once.

The image forming device 30 is disposed downstream from the sheet conveyance device 20 in the sheet conveyance direction of the continuous sheet P. The image forming device 30 discharges ink to the continuous sheet P that is conveyed by the sheet conveyance device 20 in a sub-scanning direction B, so that an image is formed on the continuous sheet P. As illustrated in FIGS. 1, 2, and 4, the image forming device 30 mainly includes a carriage 31, a main scanning motor 32, a drive force transmission mechanism 33, a platen 34, a main scanning encoder sheet 35, a main scanning encoder sensor 36, and a media sensor 37.

As illustrated in FIGS. 1 and 4, the carriage 31 reciprocally moves along a guide rod 38*a* and a sub-guide rail 38*b*, both extending in a main scanning direction A (i.e., the width direction of the continuous sheet P) perpendicular to the sub-scanning direction B (i.e., the sheet conveyance direction of the continuous sheet P). In other words, the width direction of the continuous sheet P intersects with the sheet conveyance direction of the continuous sheet P. Further, the carriage 31 mounts recording heads 31*k*, 31*c*, 31*m*, and 31*y* that discharge inks of respective colors (that is, black, cyan, magenta, and yellow). The recording heads 31*k*, 31*c*, 31*m*, and 31*y* discharge the inks supplied from ink cartridges 39*k*, 39*c*, 39*m*, and 39*y*, respectively, toward the continuous sheet P that is supported by the platen 34.

As the drive force transmission mechanism 33 transmits the driving force of the main scanning motor 32 to the carriage 31, the carriage 31 moves in the main scanning direction A. To be more specific, the drive force transmission mechanism 33 includes a drive pulley 33*a*, a p, and a timing belt 33*c*. The drive pulley 33*a* and the pressure pulley 33*b* are disposed spaced apart in the main scanning direction A. The timing belt 33*c* is an endless loop wound around the drive pulley 33*a* and the pressure pulley 33*b*.

As the main scanning motor 32 transmits the driving force to the drive pulley 33*a*, the drive pulley 33*a* rotates. Along with rotation of the drive pulley 33*a*, the timing belt 33*c* is rotated to reciprocally move the carriage 31 mounted on the timing belt 33*c* in the main scanning direction A. Further, the pressure pulley 33*b* applies a predetermined tension to the timing belt 33*c*.

The platen 34 is disposed facing the carriage 31 in the vertical direction. Then, the platen 34 supports the continuous sheet P conveyed by the sheet conveyance device 20. Further, the platen 34 has a color having the reflectance of light lower than the reflectance of light of the continuous sheet P. For example, the continuous sheet P is white while the platen 34 is black.

The main scanning encoder sheet 35 is extended in the main scanning direction A at the position facing the carriage 31. The main scanning encoder sensor 36 is mounted on the carriage 31. Further, the main scanning encoder sensor 36 reads the main scanning encoder sheet 35 and outputs the pulse signal indicating the read amount of rotation of the main scanning encoder sheet 35, to the controller 50.

The media sensor 37 emits light toward the platen 34 or the continuous sheet P that is supported by the platen 34 and receives the reflection light reflected on the platen 34 or the continuous sheet P. Then, the media sensor 37 outputs a signal of intensity indicating the intensity of the received reflection light, to the controller 50. The media sensor 37 is used, for example, to detect the widthwise end of the continuous sheet P, in other words, the end in the width direction of the continuous sheet P.

The sheet take-up device 40 is disposed downstream from the sheet conveyance device 20 and the image forming device 30 in the sheet conveyance direction of the continuous sheet P. The sheet take-up device 40 takes up the continuous sheet P on which an image is formed by the image forming device 30. The sheet take-up device 40 includes a sheet take-up roller 41, a sheet take-up motor 42, a torque limiter 43, a take-up amount encoder sheet 44, a take-up amount encoder sensor 45, a take-up motor encoder sheet 46, and a take-up motor encoder sensor 47.

The sheet take-up roller 41 takes up the continuous sheet P after image formation, in other words, the continuous sheet P on which an image is formed. The sheet take-up motor 42 rotates the sheet take-up roller 41 by applying a drive voltage from the controller 50. The torque limiter 43 manages the upper limit of the torque transmitted from the sheet take-up motor 42 to the sheet take-up roller 41.

The take-up amount encoder sheet 44 rotates together with the sheet take-up roller 41. The take-up amount encoder sensor 45 reads the amount of rotation of the take-up amount encoder sheet 44 and outputs the pulse signal indicating the read amount of rotation of the take-up amount encoder sheet 44, to the controller 50. The take-up motor encoder sheet 46 rotates together with the output shaft of the sheet take-up motor 42 as a single unit.

The take-up motor encoder sensor 47 reads the amount of rotation of the take-up motor encoder sheet 46 and outputs the pulse signal indicating the read amount of rotation of the take-up motor encoder sheet 46, to the controller 50.

The controller 50 controls the operation of the image forming apparatus 1. More particularly, the controller 50 controls operations of the sheet feed device 10, the sheet conveyance device 20, the image forming device 30, and the sheet take-up device 40 to form an image on the continuous sheet P.

As illustrated in FIG. 5, the controller 50 mainly includes a field-programmable gate array (FPGA) 51, a central processing unit (CPU) 52, a memory 53, and a motor driver 54. The CPU 52 reads and executes the program stored in the memory 53. Such processing configures a software controller including various functional modules of the image forming apparatus 1. The software controller thus configured cooperates with hardware resources of the image forming apparatus 1 construct functional blocks to implement functions, illustrated as functional blocks, of the image forming apparatus 1. In addition, the image forming apparatus 1 may use the FPGA 51 to implement the function customized for each of separate image forming apparatuses 1.

The controller 50 rotates each of the sheet feed motor 12, the sheet conveyance motor 23, the main scanning motor 32, and the sheet take-up motor 42 by applying a drive voltage via the motor driver 54. Further, the controller 50 outputs a discharge signal to each of the recording heads 31*k*, 31*c*, 31*m*, and 31*y*, so as to cause the recording heads 31*k*, 31*c*, 31*m*, and 31*y* to discharge ink.

Further, the controller 50 acquires pulse signals from the sheet remaining encoder sensor 15, the sheet feed motor encoder sensor 17, the sheet conveyance encoder sensor 25, the main scanning encoder sensor 36, the take-up amount encoder sensor 45, and the take-up motor encoder sensor 47. The controller 50 also acquires the HP signal from the HP sensor 26. Then, the controller 50 counts the acquired pulse signals (hereinafter, the number of counted pulse signals is referred to as an "encoder value"). The controller 50 determines the amount of rotation and a movement amount based on the encoder value and the HP signal.

Figure 6A:
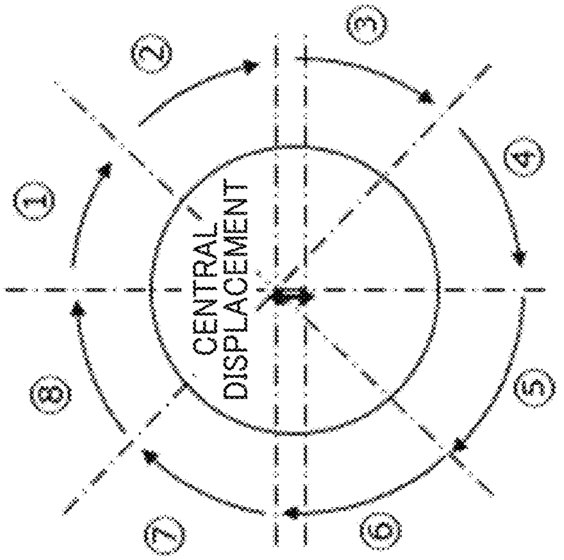
FIGS. 6A and 6B are diagrams illustrating a variation in distance from the rotation center to an outer peripheral surface of a sheet conveyance roller.
Figure 6B:
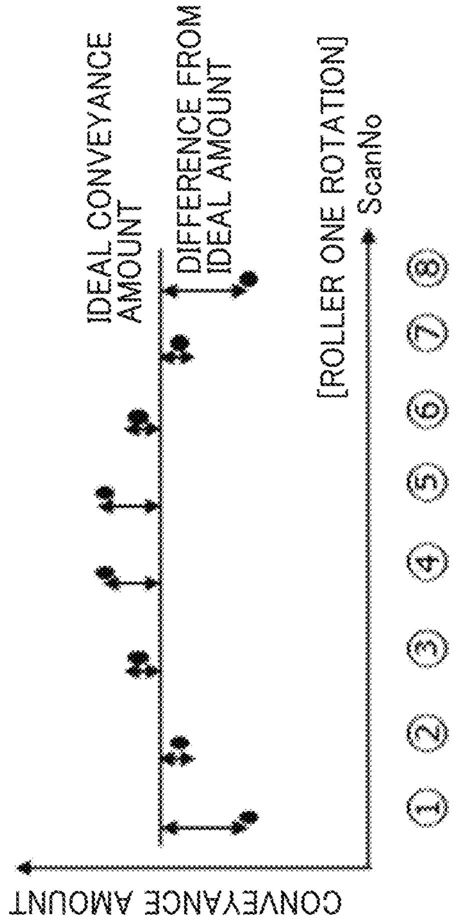
Figure 7:
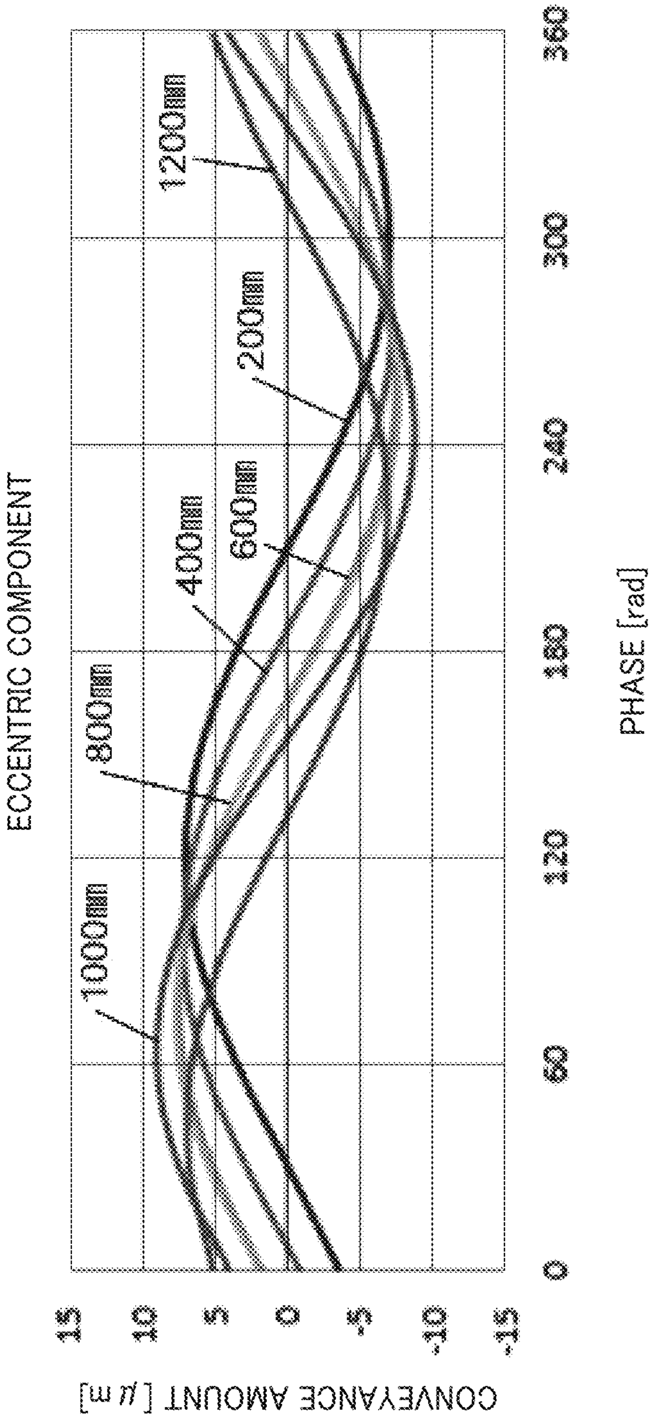
FIG. 7 is a graph illustrating profile data at each position in an axial direction of the sheet conveyance roller.

FIGS. 6A and 6B are diagrams illustrating a variation in distance from the rotation center to an outer peripheral surface of the sheet conveyance roller 21. FIG. 7 is a graph illustrating profile data at each position in the axial direction of the sheet conveyance roller 21.

The sheet conveyance roller 21 is eccentric due to a manufacturing error and the like. Therefore, as illustrated in FIG. 6A, the distance from the rotation center to the outer peripheral surface of the sheet conveyance roller 21 (hereinafter, referred to as a "radius") is different among areas (1) to (8) in the circumferential direction of the sheet conveyance roller 21. An actual conveyance amount in each of the areas (1) to (8) of such sheet conveyance roller 21 may be measured in advance by a method disclosed in, for example, Japanese Unexamined Patent Application Publication No. 2010-214662. Description of a specific measurement method is omitted.

In the example of FIGS. 6A and 6B, an actual radius in the areas (1), (2), (7), and (8) of the sheet conveyance roller 21 is shorter than an ideal radius (radius in design). Therefore, when the sheet conveyance roller 21 rotates in a state in which the continuous sheet P abuts the areas (1), (2), (7), and (8), the actual conveyance amount is smaller than an ideal conveyance amount. In contrast, the actual radius in the areas (3) to (6) of the sheet conveyance roller 21 is longer than the ideal radius. Therefore, when the sheet conveyance roller 21 rotates in a state in which the continuous sheet P abuts the areas (3) to (6), the actual conveyance amount becomes larger than the ideal conveyance amount.

Therefore, the memory 53 stores in advance profile data indicating a variation in conveyance amount in the circumferential direction due to eccentricity of the sheet conveyance roller 21. Measured values of the conveyance amount illustrated in FIG. 6B may be approximated by a sine curve illustrated in FIG. 7. That is, the profile data may be the measured values of the variation in conveyance amount or the sine curve that approximates the measured values.

Amplitude and a phase of the approximate sine curve are different among positions (in the example of FIG. 7, positions of 200 mm, 400 mm, 600 mm, 800 mm, 1000 mm, and 1200 mm from a right end in the axial direction) in the axial direction of the sheet conveyance roller 21. Therefore, as illustrated in FIG. 7, the memory 53 stores a plurality of pieces of profile data corresponding to respective positions in the axial direction of the sheet conveyance roller 21.

The profile data is not limited to the data indicating the actual conveyance amount in each area in the circumferential direction of the sheet conveyance roller 21, and may be a sine curve indicating a correction value of a "predetermined conveyance amount" in intermittent conveyance processing. The sine curve indicating the correction value corresponds to a curve obtained by reversing the sine curve illustrated in FIG. 7 with respect to the abscissa (refer to FIG. 10).

Figure 8:
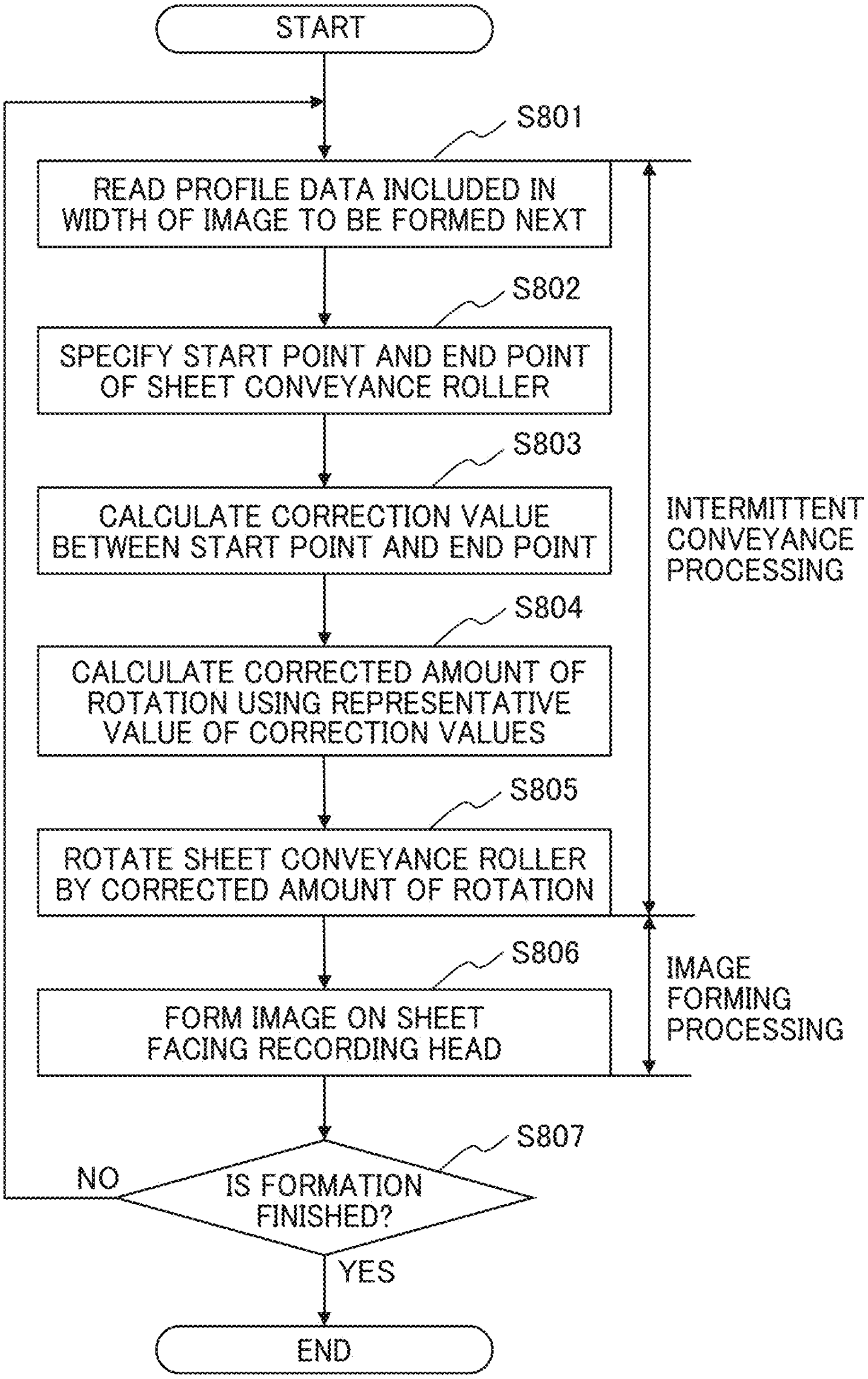
FIG. 8 is a flowchart of processing of forming an image.
Figure 9B:
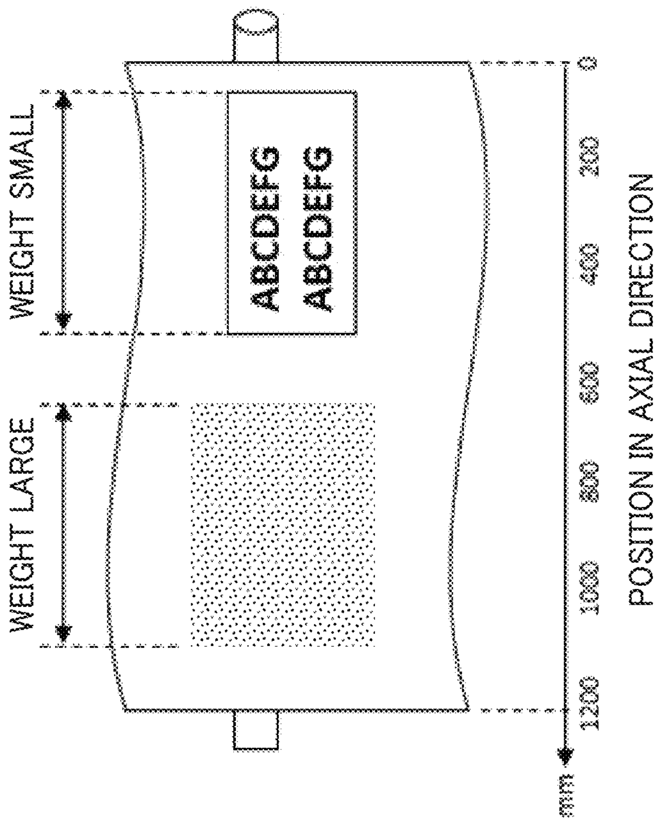
FIGS. 9A and 9B are diagrams illustrating an example of an image recorded on a continuous sheet.
Figure 9A:
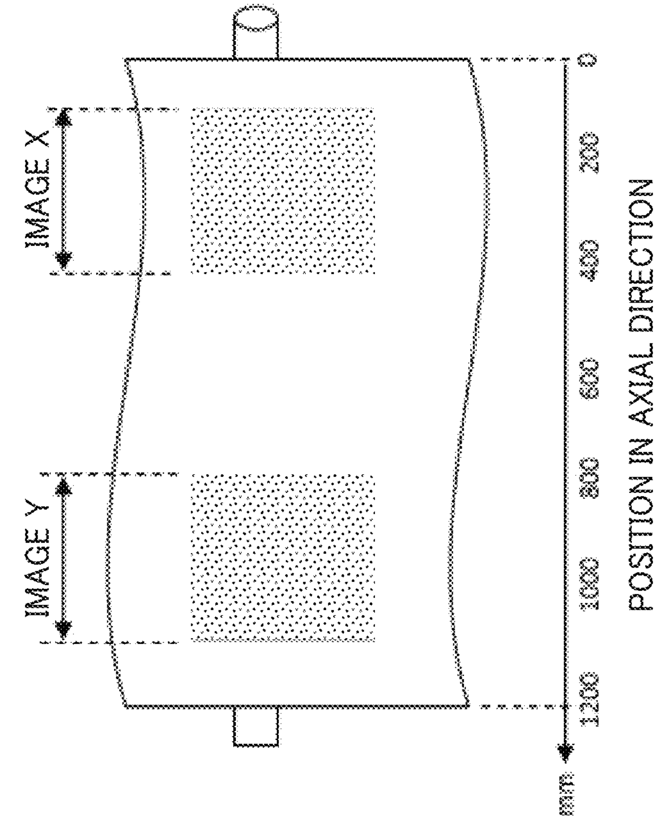
Figure 10:
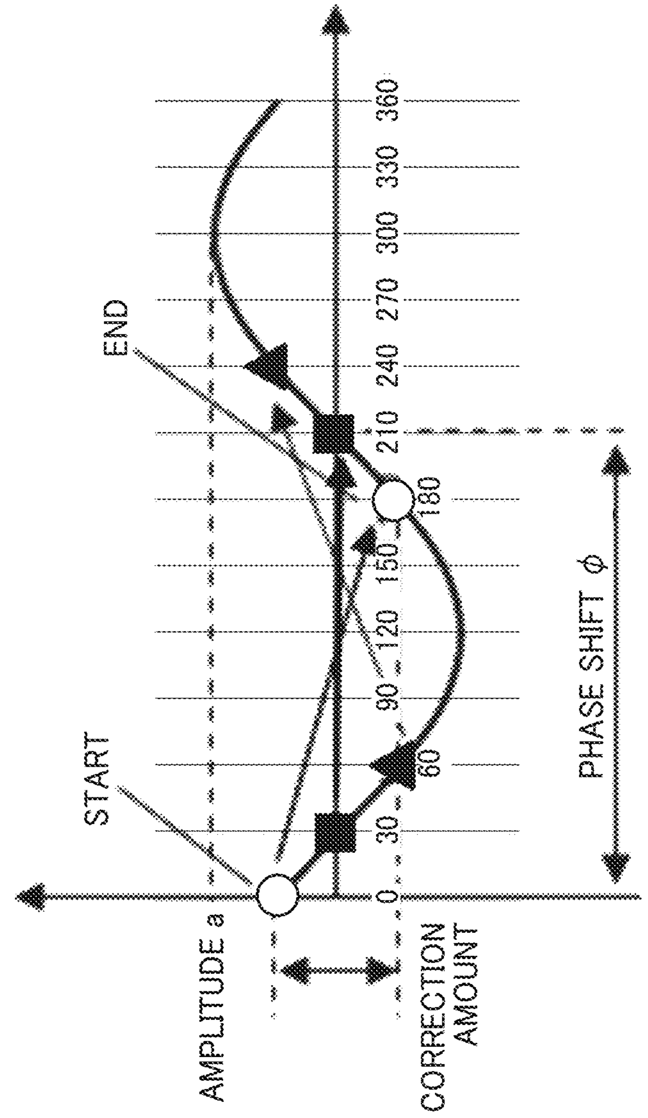
FIG. 10 is a graph illustrating a relationship between a start point and an end point, and a correction amount in intermittent conveyance processing.

Next, processing in which the image forming apparatus 1 forms an image on the continuous sheet P is described with reference to FIGS. 8 to 10. FIG. 8 is a flowchart of the processing of forming an image. FIGS. 9A and 9B are diagrams illustrating an example of an image recorded on the continuous sheet P. FIG. 10 is a graph illustrating a relationship between a start point and an end point, and the correction amount in the intermittent conveyance processing. The controller 50 starts the processing illustrated in FIG. 7, for example, in response to acquisition of an image formation instruction from an operation panel or an external device.

The image formation instruction includes image data indicating an image to be formed on the continuous sheet P. The image formation instruction may also include area information indicating an area in which a non-base color image is formed, a margin area, an area in which a high-density image (so-called solid image) is formed, and an area in which a low-density image (so-called line drawing) is formed out of the continuous sheet P. It is also possible that the area information is not included in the image formation instruction and may be specified by the controller 50 by analyzing the image data.

As illustrated in FIG. 8, the controller 50 repeatedly executes the intermittent conveyance processing (S801 to S805) and image forming processing (S806) to form an image instructed by the image formation instruction (hereinafter, referred to as a "target image") on the continuous sheet P. That is, the image forming apparatus 1 forms a part of the target image on the continuous sheet P in one image forming processing, and repeats the image forming processing while intermittently conveying the continuous sheet P to form an entire target image on the continuous sheet P.

The intermittent conveyance processing is processing of rotating the sheet conveyance roller 21 to allow the sheet conveyance device 20 to convey the continuous sheet P by a predetermined conveyance amount determined in advance. The "predetermined conveyance amount" corresponds to a length in the sheet conveyance direction of each of the recording heads 31*k*, 31*c*, 31*m*, and 31*y*. In the intermittent conveyance processing, the controller 50 may drive the sheet conveyance motor 23 until the number of pulse signals corresponding to the predetermined conveyance amount are output from the sheet conveyance encoder sensor 25.

Here, the controller 50 allows the sheet feed device 10 to feed the continuous sheet P, allows the sheet conveyance device 20 to convey the continuous sheet P fed by the sheet feed device 10, and allows the sheet take-up device 40 to take up the continuous sheet P conveyed by the sheet conveyance device 20. By operating the sheet feed device 10, the sheet conveyance device 20, and the sheet take-up device 40 in conjunction with one another, the continuous sheet P may be conveyed without slack. Since this processing is already known, a detailed description thereof is omitted.

The image forming processing is processing of allowing the image forming device 30 to form an image in the area of the continuous sheet P facing the image forming device 30 (more particularly, the recording heads 31*k*, 31*c*, 31*m*, and 31*y*) by the intermittent conveyance processing. The controller 50 drives the main scanning motor 32 to move the carriage 31 in the main scanning direction A. The controller 50 allows the recording heads 31*k*, 31*c*, 31*m*, and 31*y* to discharge ink at a predetermined timing indicated by the encoder value of the main scanning encoder sensor 36, thereby forming an image on the continuous sheet P.

The controller 50 according to this embodiment executes the processing at steps S801 to S805 in the intermittent conveyance processing. The processing at steps S801 to S805 is processing of correcting the amount of rotation of the sheet conveyance roller 21 in accordance with an image to be formed on the sheet in order to keep the conveyance amount of the sheet in the intermittent conveyance processing constant.

The controller 50 first reads, from the memory 53, the profile data at a position included in a width of an image to be formed in next image forming processing among a plurality of pieces of profile data stored in the memory 53 (S801). In this embodiment, the profile data at positions of 200 mm, 400 mm, and 1000 mm are read out of six pieces of profile data illustrated in FIG. 7.

Here, for example, as illustrated in FIG. 9A, the "width of the image" refers to a distance between both ends in the main scanning direction A (=the width direction of the continuous sheet P) of a non-base color image recorded on the continuous sheet P. In other words, the "width of the image" refers to a distance between both ends in the main scanning direction A of ink continuously discharged to the continuous sheet P.

As illustrated in FIG. 9A, in a case of forming images X and Y in a plurality of areas separated in the width direction of the continuous sheet P in the next image forming processing, the controller 50 reads the profile data at positions included in the images X and Y. That is, the controller 50 reads the profile data at the positions of 200 mm and 400 mm included in the image X and the profile data at the position of 1000 mm included in the image Y.

The controller 50 next specifies the start point and end point of the intermittent conveyance processing based on detection results of the sheet conveyance encoder sensor 25 and the HP 26 (S802). The start point is a point that abuts the continuous sheet P at the start of the intermittent conveyance processing in the circumferential direction of the sheet conveyance roller 21. The end point is a point that abuts the continuous sheet P at the end of the intermittent conveyance processing in the circumferential direction of the sheet conveyance roller 21. The execution order of steps S801 and S802 may be reversed.

More particularly, the controller 50 may specify a point (=start point) in the circumferential direction of the sheet conveyance roller 21 that currently abuts the continuous sheet P based on the encoder value of the sheet conveyance encoder sensor 25 from the output of the HP signal from the HP sensor 26 until the present.

Next, the controller 50 specifies a point (=end point) in the circumferential direction of the sheet conveyance roller 21 that abuts the continuous sheet P when the sheet conveyance roller 21 is rotated by a reference amount of rotation determined in advance from the specified start point. The reference amount of rotation is an ideal amount of rotation of the sheet conveyance roller 21 required to convey the continuous sheet P by a predetermined conveyance amount in a case where the sheet conveyance roller 21 is not eccentric.

That is, as illustrated in FIG. 10, the controller 50 specifies a start point=0° and an end point=180° indicated by circles at step S802 in a certain turn. The controller 50 specifies a start point=30° and an end point=210° indicated by squares at step S802 in another turn. The controller 50 further specifies a start point=60° and an end point=240° indicated by triangle plots at step S802 in still another turn. That is, a combination of the start point and the end point is different in each intermittent conveyance processing.

As an example, the start point and the end point may be represented by angles with respect to a phase angle of the reference point at 0° as illustrated in FIG. 10. As another example, the start point and the end point may be represented by the encoder value of the sheet conveyance encoder sensor 25 with respect to the encoder value of the reference point being 0.

Next, the controller 50 calculates the correction value that is a difference between the predetermined conveyance amount and the actual conveyance amount based on each of a plurality of pieces of profile data read at step S801 (S803). That is, the controller 50 according to this embodiment calculates the correction values at the positions of 200 mm, 400 mm, and 1000 mm.

More particularly, the controller 50 reverses the read profile data (FIG. 7) with respect to the abscissa. In a case where the data is stored in the memory 53 in an already reversed state, this step is omitted. Next, the controller 50 calculates the correction value between the start point and the end point of the reversed sine curve. In this embodiment, a difference between the amplitude at the start point and the amplitude at the end point is calculated as the correction value in the sine curve illustrated in FIG. 10.

Next, the controller 50 corrects the reference amount of rotation with a representative value of a plurality of correction values calculated at step S803 to calculate a corrected amount of rotation (S804). The "representative value of the correction values" refers to, for example, a simple average value, a weighted average value, a median value, a mode value and the like of a plurality of correction values.

In this embodiment, an example in which the weighted average value of the plurality of correction values is set as the "representative value" is described. That is, the controller 50 multiplies each of the plurality of correction values calculated at step S803 by a corresponding weight and adds them to calculate the representative value of the correction values.

For example, as illustrated in FIG. 9B, the weight of the correction value included in a width of the line drawing such as a character is made relatively small, and the weight of the correction value included in a width of the solid image such as a photograph is made relatively large. The "line drawing" is an example of an image of which density (in the inkjet method, an amount of ink adhered per unit area of the continuous sheet P) is smaller than a threshold value. The "solid image" is an example of an image of which density is equal to or larger than a threshold value.

Then, the controller 50 increases or decreases the amount of rotation corresponding to the representative value of the correction values from the reference amount of rotation to calculate the corrected amount of rotation. The corrected amount of rotation is calculated by, for example, following equation 1. The reference amount of rotation, the corrected amount of rotation, and the representative value of the correction values are represented by, for example, the phase angle of the sheet conveyance roller 21 and the encoder value of the sheet conveyance encoder sensor 25.

Equation 1

$$\text{Corrected amount of rotation} = \text{Reference amount of rotation} + a \times \{\sin[(\theta n - \phi) + \text{Reference amount of rotation}]\sin(\theta n - \phi\} \quad \text{Equation 1}$$

In equation 1 described above, a represents maximum amplitude of the representative value obtained by approximating a feed amount error due to eccentricity of the sheet conveyance roller 21 with a sine wave. In addition, θn represents a current rotation angle of the sheet conveyance roller 21. Furthermore, φ represents a phase angle from a reference position of the representative value obtained by approximating the feed amount error due to eccentricity of the sheet conveyance roller 21 with a sine wave. In Equation 1 described above, a, φ, and a×sin(θn−φ) are examples of the "representative value of the correction values".

That is, in a case of conveying the continuous sheet P in a range of the areas (7) to (1) in FIG. 6A, the representative value of the correction values is a positive value, so that the corrected amount of rotation is larger than the reference amount of rotation. In contrast, in a case of conveying the continuous sheet P in a range of the areas (2) to (6) in FIG. 6A, the representative value of the correction values is a negative value, so that the corrected amount of rotation is smaller than the reference amount of rotation.

Then, the controller 50 drives the sheet conveyance motor 23 to rotate the sheet conveyance roller 21 by the calculated corrected amount of rotation (S805). As a result, the continuous sheet P is conveyed by a predetermined conveyance amount regardless of magnitude of the eccentricity amount between the start point and the end point.

Next, the controller 50 executes the image forming processing as described above (S806). Next, the controller 50 determines whether the entire target image is formed on the continuous sheet P (S807). In a case of determining that the entire target image is not yet formed on the continuous sheet P (S807: No), the controller 50 executes the processing at step S801 and subsequent steps again. In contrast, in a case of determining that the entire target image is formed on the continuous sheet P (S807: Yes), the controller 50 finishes the processing illustrated in FIG. 7.

According to the above-described embodiment, the following operational effects, for example, are achieved.

Generally, in image forming processing, it is not limited that an image is formed over an entire area in the width direction of a sheet. Therefore, when the correction value corresponding to the width of the sheet is used, the eccentricity amount of a conveyance roller at a position where the image is not formed is also taken into consideration, and there is a possibility that the conveyance amount is not suitable for the position where the image is actually formed. As a result, in the related art, an effect of reducing the density unevenness of the image may not be sufficient.

According to the above-described embodiment, the controller 50 corrects the amount of rotation of the sheet conveyance roller 21 in consideration of only the variation in conveyance amount at the position included in the width of the image on the continuous sheet P in the axial direction of the sheet conveyance roller 21. As a result, the conveyance amount of the continuous sheet P in the intermittent conveyance processing may be appropriately corrected in accordance with the image to be formed on the continuous sheet P. As a result, the density unevenness of the image formed on the continuous sheet P is further reduced.

According to the above-described embodiment, in a case where the images are formed in a plurality of areas separated in the width direction of the continuous sheet P, the controller 50 calculates the correction value at each position included in the width of each image. Therefore, the density unevenness of each image (images X and Y in FIGS. 9A and 9B) may be reduced.

According to the above-described embodiment, by making the weight of the correction value included in the width of the solid image larger than the weight of the correction value included in the width of the line drawing, the density unevenness of the solid image may be preferentially reduced. When the weight of the line drawing is set to 0, the amount of rotation of the sheet conveyance roller 21 may be corrected only by the correction value included in the width of the solid image.

According to the above-described embodiment, the correction value is calculated by specifying the start point and the end point in each intermittent conveyance processing repeatedly executed, so that a more accurate correction value may be obtained. As a result, the density unevenness of the image is further reduced.

Furthermore, according to the above-described embodiment, a calculation amount at step S803 may be reduced by approximating the variation in conveyance amount by the sine curve and using the difference in amplitude between the start point and the end point as the correction value.

Although the example in which the present disclosure is applied to the image forming apparatus 1 is described in the above-described embodiment, this may also be conceived as a method in which the image forming apparatus 1 forms an image on the continuous sheet P (image forming method) and a program executed by the controller 50. The sheet is not limited to the continuous sheet P, and may be a cut sheet. Furthermore, the present disclosure is also applicable to a serial printer, a line printer and the like.

The present disclosure is not limited to the above-described embodiments, and various modifications can be made without departing from the technical spirit of the present disclosure. It is therefore to be understood that the disclosure of the present specification may be practiced otherwise by those skilled in the art than as specifically described herein. Such embodiments and variations thereof are included in the scope and gist of the embodiments of the present disclosure and are included in the embodiments described in claims and the equivalent scope thereof.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus, comprising:

a sheet conveyance device including a sheet conveyance roller and a pressure roller configured to hold and convey a sheet between the sheet conveyance roller and the pressure roller;

an image forming device configured to form an image on the sheet conveyed by the sheet conveyance device;

a memory configured to store profile data for each of a plurality of positions in an axial direction of the sheet conveyance roller, the profile data indicating a variation in conveyance amount in a circumferential direction due to eccentricity of the sheet conveyance roller; and a controller configured to control the sheet conveyance device and the image forming device, wherein the controller is configured to repeatedly execute intermittent conveyance processing and image forming processing, the intermittent conveyance processing including rotating the sheet conveyance roller to cause the sheet conveyance device to convey the sheet by a predetermined conveyance amount; and the image forming processing including causing the image forming device to form an image on an area of the sheet having been conveyed to a position facing the image forming device by the intermittent conveyance processing, and wherein the controller is configured to:

calculate, in the intermittent conveyance processing, a correction value based on corresponding profile data for each of a plurality of positions included in a width of an image to be formed on the sheet in next image forming processing, the correction value being a difference between the predetermined conveyance amount and an actual conveyance amount;

correct a reference amount of rotation by a representative value of a plurality of calculated correction values to calculate a corrected amount of rotation, the reference amount of rotation being an ideal amount of rotation of the sheet conveyance roller that conveys the sheet by the predetermined conveyance amount; and rotate the sheet conveyance roller by the corrected amount of rotation calculated.

2. The image forming apparatus according to claim 1, wherein, in a case of forming images in a plurality of separate areas in a width direction of the sheet in the next image forming processing, the controller is configured to calculate the correction value for each position included in a width of each of the images.

3. The image forming apparatus according to claim 1, wherein the representative value is a weighted average value of the plurality of correction values, and wherein the controller is configured to set a first weight of a correction value for a position included in a width of an image having a density equal to or larger than a threshold value to be larger than a second weight of a correction value for a position included in a width of an image having a density smaller than the threshold value, to calculate the weighted average value.

4. The image forming apparatus according to claim 1, further comprising:

a reference point sensor configured to detect a reference point in the circumferential direction of the sheet conveyance roller; and a rotation amount sensor configured to detect an amount of rotation of the sheet conveyance roller, wherein the controller is configured to:

specify, in the intermittent conveyance processing, a start point abutting the sheet at a start of the intermittent conveyance processing and an end point abutting the sheet at an end of the intermittent conveyance processing in the circumferential direction of the sheet conveyance roller, based on a combination of detection results of the reference point sensor and the rotation amount sensor; and calculate the correction value between the start point and the end point specified by the controller, based on the profile data.

5. The image forming apparatus according to claim 4, wherein the profile data is a sine curve obtained by approximating a variation in conveyance amount at points in the circumferential direction of the conveyance roller, and wherein the controller is configured to calculate, as the correction value, a difference between an amplitude of the sine curve at the start point and an amplitude of the sine curve at the end point.

6. An image forming method to be executed by an image forming apparatus that includes an image forming device and a sheet conveyance device, the sheet conveyance device including a sheet conveyance roller and a pressure roller configured to hold and convey a sheet between the sheet conveyance roller and the pressure roller, the image forming method comprising:

repeatedly executing intermittent conveyance processing and image forming processing, the intermittent conveyance processing including rotating the sheet conveyance roller to convey the sheet by a predetermined conveyance amount; and the image forming processing including causing the image forming device to form an image on an area of the sheet having been conveyed to a position facing the image forming device by the intermittent conveyance processing;

calculating, in the intermittent conveyance processing, a correction value based on corresponding profile data for each of a plurality of positions included in a width of an image to be formed on the sheet in next image forming processing, the correction value being a difference between the predetermined conveyance amount and an actual conveyance amount, the corresponding profile data indicating a variation in conveyance amount in a circumferential direction due to eccentricity of the sheet conveyance roller;

correcting a reference amount of rotation by a representative value of a plurality of calculated correction values to calculate a corrected amount of rotation, the reference amount of rotation being an ideal amount of rotation of the sheet conveyance roller that conveys the sheet by the predetermined conveyance amount; and rotating the sheet conveyance roller by the corrected amount of rotation calculated.

* * * * *